Dec. 31, 1957  F. M. MAYES  2,818,503
ELEVATION METER
Filed Oct. 18, 1951  3 Sheets-Sheet 1

INVENTOR.
FRED M. MAYES
BY
ATTORNEYS.

Dec. 31, 1957 F. M. MAYES 2,818,503
ELEVATION METER
Filed Oct. 18, 1951 3 Sheets-Sheet 3

INVENTOR.
FRED M. MAYES
BY
Busser & Smith
ATTORNEYS.

United States Patent Office 2,818,503
Patented Dec. 31, 1957

2,818,503
ELEVATION METER

Fred M. Mayes, Delaware County, Pa., assignor to Sun Oil Company, Philadelphia, Pa., a corporation of New Jersey Application October 18, 1951, Serial No. 251,970

10 Claims. (Cl. 250—27)

This invention relates to improvements particularly concerned with elevation meters but of more general applicability.

In the patent to Johnson and Mayes, Number 2,647,323, dated August 4, 1953, there is disclosed an elevation meter of a type designed to traverse a roadway and register automatically changes of elevation thereof. As described in said application, it is preferred to provide as a carrying vehicle a trailer arranged to be towed by an automobile or truck, which trailer and/or automobile carry electrical apparatus responsive to changes of roadway inclination and the lengths of path traversed in such fashion as to give an accurate indication of changes of elevation. Said apparatus performs an integration involving the length of the traversed path and the sine of the angle of inclination of the roadway, the integration being performed in a statistical fashion and giving rise to a high degree of accuracy of measurement despite accelerations which would ordinarily be assumed to be highly detrimental to measurement. In particular, there is provided a pendulum which is responsive to accelerations including the acceleration due to gravity. This pendulum is maintained on the average perpendicular to the surface of the roadway. Actually, it is constantly in oscillation about this position of perpendicularity which may be considered its null position. The pendulum is maintained statistically in this null position by virtue of opposed pulses applied electromagnetically thereto. Measurement of the forces which are required to maintain the null position gives, in statistical fashion, a continuous measurement of the sine of the angle of inclination of the roadway.

The general object of the present invention is the provision of refinements in the type of apparatus disclosed in said application.

One of the objects of the present invention is the provision of an arrangement for stabilizing the firing of a pair of thyratrons to provide firing at proper times but with very considerable independence of transients which may occur and which would normally tend to produce spurious firings giving rise to possible inaccuracies in the ultimate results.

A further object of the invention relates to the provision of a current stabilizing circuit which, in particular, is adapted to provide rectangular current pulses the positive and negative cycles of which are of equal amplitude and of very precisely defined amplitude.

A further object of the invention is the provision of a scaling circuit or counter circuit which provides for ready interpolation between ultimate mechanical counter readings, the interpolation being effected by the reading of a meter provided with a suitable scale.

Still another object of the invention has to do with the provision of an improved type of phase detector which is applied to detection of phase shifts occurring when the pendulum deviates on either side of the null position.

These and other objects of the invention particularly relating to details of construction and operation will become apparent from the following description, read in conjunction with the accompanying drawings, in which.

The present apparatus is in general similar to that of said Johnson and Mayes application and reference may be made thereto for details of mechanical construction, provisions for carrying the apparatus in traversing a roadway, and matters of theory involved in securing results statistically. It will be readily recognized from what follows how the present apparatus is associated with other parts of the elevation meter and how substitutes are provided for various circuit elements of said application.

Figure 1:
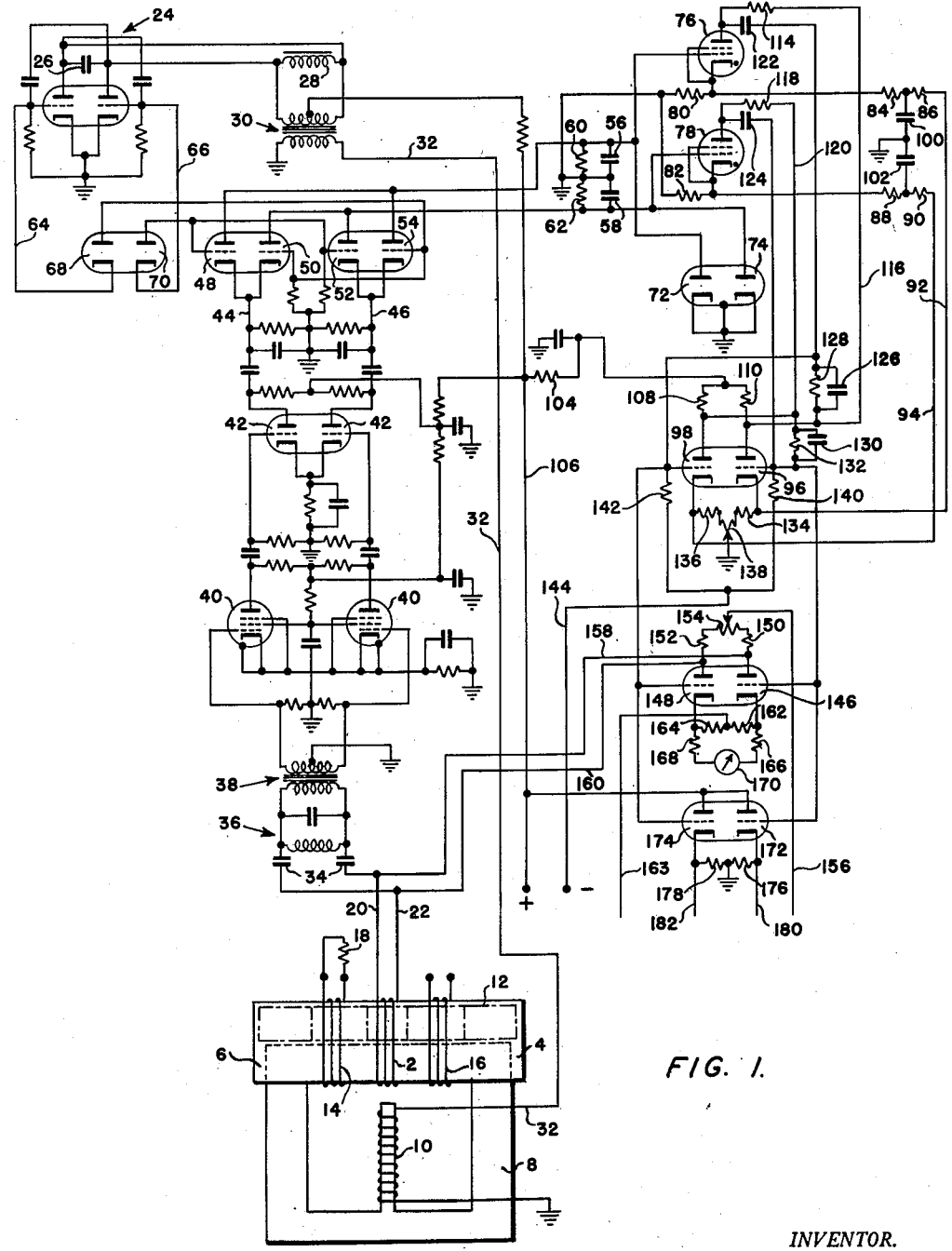
Figure 1 is a wiring diagram illustrating, in particular, the circuits associated with a pendulum for giving rise to rectangular current pulses the difference in duration of which is a measure of the inclination of the pendulum from the vertical.

Referring first to Figure 1 there is illustrated therein the arrangement for maintaining a pendulum constantly perpendicular to a path of movement of the apparatus (a trailer as in said Johnson and Mayes application) despite inclinations of that path, the maintenance of perpendicularity being in a statistical sense: i. e., the pendulum is "on the average" perpendicular to the path. This average perpendicularity is secured to a high degree of precision.

The pendulum unit may have the mechanical construction which is shown and described in detail in said Johnson and Mayes application and accordingly this is illustrated herein only in diagrammatic form. The pendulum coil indicated at 2 is mounted as in said application so as to tend towards a vertical position in the absence of the restoring forces produced as will be described, though its excursions from perpendicularity to the path of movement of the apparatus may be limited so that it will have only a small angular range of movement and its spring mounting may exert a substantial torque upon its deviations from perpendicularity to the path of movement. This pendulum coil 2 surrounds a solid magnetic core 4 in a groove in which there is located, with provision of air gaps to reduce interactions between circuits, a laminated core indicated at 6 also extending through the pendulum coil. An E-shaped laminated core 8 is positioned so that its end poles are bridged by the core 6 while its central pole is spaced from the laminated core to provide an air gap within which the lower portions of the convolutions of the coil 2 may move. The central pole is surrounded by a winding 10. As will be described this winding is energized by an alternating current to provide an alternating flux through the laminated magnetic circuit.

On each side of the core 4 there is provided an E-shaped strong permanent (Alnico) magnet 12 having its end poles engaging the core 4 and its central pole spaced from the core to provide an air gap in which may move the side of the coil 2. The flux across these air gaps is substantially uniform, the area of each gap being sufficiently extended so that no part of the side of the coil 2 will move beyond it, the coil 2 having, in operation, only a very limited movement on each side of its null position. Coils 14 and 16 are provided about the cores 4 and 6 and one or the other may be shunted by a suitably selected resistance 18, their purpose being to minimize quadrature components of the output. The leads 20 and 22 from the ends of the coil 2 deliver the signal induced in the coil by the alternating flux produced by coil 10 and also serve to receive pulses which, as will hereafter appear, tend to hold the coil 2 in its null position.

An oscillator 24 comprises a pair of triodes having their elements interconnected in conventional fashion by resistors and condensers to provide a multivibrator which is connected to a tuned tank consisting of inductance 28 and condenser 26. As will be evident hereafter, the frequency of this oscillator is not critical inasmuch as its output, used for phase detection, is not ultimately used for its frequency value. Consistent with convenient and practical construction of the pendulum assembly the frequency of this oscillator may be of the order of 5 to 15 kilocycles per second. It will, of course, be evident that the oscillator may be replaced by any of a large number of types of oscillators well known to the art.

The output from the oscillator 24 is delivered through the transformer 30 and connection 32 to the driver winding 10 of the pendulum assembly heretofore described. The current in the driver winding will induce in the circuit of detector coil 2 currents which will vary with the position of the detector coil. When the pendulum is in its normal mid-position corresponding to perpendicularity to the roadway, the signals induced in the detector coil will be at a minimum but, as in the case of most alternating current bridge or balance arrangements, the signals will not be reduced to zero but rather will contain harmonics of the fundamental frequency and a minor component of the fundamental frequency 90° out of phase with the normal signals which would be produced with deviation of the pendulum from the perpendicularity mentioned. This last quadrature component is minimized by a suitable load resistance 18 on one of the coils 14 or 16. It will be evident that as the coil 2 deviates in one direction or the other from the mid-position a signal will be produced in the form of current induced therein which will have a phase relative to the phase of the exciting current in winding 10 depending upon the direction of the deviation.

Connections 20 and 22 deliver the signal from pendulum coil 2 through condensers 34 to a filter which may consist merely of a coil shunted by a condenser to select for transmission to transformer 38 the desired frequency, which is approximately that of oscillator 24. This filter is slightly detuned from the oscillator frequency to prevent phase shift sensitivity. The transformer 38 feeds the push-pull amplifier stage comprising the pentodes 40 which, in turn, feeds the second push-pull amplifier stage comprising the triodes 42. These amplifier stages may be conventional. The signals from the second stage are delivered through connections 44 and 46 to a phase-sensitive circuit comprising the triodes 48, 50, 52 and 54 which are connected as illustrated. The line 44 is connected to the cathodes of the triodes 48 and 50, while the line 46 is connected to the cathodes of triodes 52 and 54. The anodes of triodes 48 and 54 are connected together and to the ungrounded side of a condenser 56, while the anodes of triodes 50 and 52 are connected together and to the ungrounded side of a condenser 58. These condensers are respectively shunted by high resistances 60 and 62.

A connection 64 from oscillator 24 passes through a diode 68 only negative half cycles to the grids of triodes 50 and 54 while the symmetrical connection 66 from the oscillator 24 passes only negative pulses to the grids of triodes 48 and 52. These connections 64 and 66 may be made to various points of the oscillator but are shown as connected to the respective grids of the triodes thereof so that at any instant the lines 64 and 66 carry signals of opposite signs.

The operation of the phase detection arrangement just described is as follows:

Assume that the phase relationship between the outputs through lines 64 and 66 and the outputs through lines 44 and 46 are such that at a particular instant line 64 is positive, line 66 is negative, line 44 is positive, and line 46 is negative. Triodes 48 and 50 will then be non-conducting in view of the fact that their cathodes are positive. Triode 52 will be non-conducting since, even though its cathode is negative, its grid will be negative due to the negative conditions of line 66. The result is that only triode 54 will be conducting, its cathode being negative and its grid at ground potential, with the result that a negative pulse is delivered to the ungrounded side of condenser 56. Assuming maintenance of the same phase relationship but 180° later, the line 64 will be negative, the line 66 will be positive, the line 44 will be negative and the line 46 will be positive. In view of similar considerations to those just described, it will be evident that only the triode 48 will be conductive and this also will result in the delivery of a negative pulse to the ungrounded side of condenser 56. It will, accordingly, be evident that a continuation of the phase relationship of the two inputs will result in accumulation of a negative charge on the ungrounded side of the condenser 56.

If the phase is now reversed so that lines 64 and 44 are of opposite signs and lines 66 and 46 are also of opposite sign, it will be evident that the triodes 50 and 52 will be alternatively conductive, the former when line 64 is positive and the latter when line 64 is negative. Under both conditions a negative pulse will be delivered to the ungrounded side of condenser 58.

During periods when the condensers are not receiving negative pulses they will discharge through the resistances 60 and 62. Accordingly, the sign of the difference between the potentials of their ungrounded sides will depend upon the phase of the current induced in coil 2 with respect to the phase of the exciting current in coil 10, and hence will depend on the direction of deviation of the coil 2 from its null position.

The ungrounded sides of condensers 56 and 58 are prevented from ever becoming positive by connection to the respective anodes of diodes 72 and 74, the cathodes of which are grounded.

A pair of thyratrons 76 and 78 have their control grids respectively connected to the ungrounded sides of condensers 56 and 58. The cathodes have their potentials raised above ground by the arrangement of resistors 80 and 82 and the pairs of resistors 84 and 86 and 88 and 90 which are respectively connected through lines 92 and 94 with the cathodes of triodes 96 and 98 which will be hereafter more fully referred to. The junctions of resistors 84 and 86 and of 88 and 90 respectively are connected to ground through condensers 100 and 102. As will be more fully described hereafter the arrangement is such that the thyratrons would pulse except for the action of the circuit.

Positive potential is applied from supply line 106 through resistance 104 and resistances 108 and 110 to the respective anodes of triodes 98 and 96. The anode of thyratron 76 is connected through resistor 114 and line 116 to the anode of triode 96. Similarly the anode of thyratron 78 is connected through resistance 118 and line 120 to the anode of triode 98. A condenser 122 joins the anode of thyratron 76 to the grid of triode 98, and a similar condenser 124 connects the anode of thyratron 78 to the grid of triode 96. The anodes and grids of the triodes 96 and 98 are cross-connected through the respective arrangements of condenser 126 and resistance 128 and of condenser 130 and resistance 132 to provide a conventional bistable multivibrator arrangement of the two triodes. The cathodes of the triodes 96 and 98 are connected to ground through the arrangement of resistances 134 and 136 connected to opposite ends of the potentiometer resistance 138, the adjustment contact of which is grounded.

While the thyratrons may be regarded as in pulsing arrangements, the circuits are such that they are unaffected adversely by transients which occur after each proper firing pulse.

Before proceeding with a description of the operation of the thyratron circuit, its general characteristics as compared with conventional circuits may be briefly outlined. Heretofore circuits have generally involved one or more thyratrons normally arranged so as to be non-operating in the absence of a control signal, for example by being biased so as not to fire. Then controlling action is effected by a signal which will fire a thyratron. The firing of a thyratron is always accompanied by a large transient, and if a pair of thyratrons are associated in the same circuit it is necessary to take special precautions to prevent firing of the second thyratron by the transient resulting from firing of the first. Filtering may often accomplish this end but generally at the expense of slowing down response of the control system. But such a system cannot be satisfactorily used unless the transient is kept isolated from the error signal input.

In the present instance, it will be noted that the same pendulum coil acts as both pick up for the error signal and as restoring coil for the pendulum and the circuits dare not involve filters of substantial time constants without interfering with proper operation. Even if separate pendulum coils were used, transients many times the magnitude of the error signals would be fed into the error detecting circuit upon firing of a thyratron. Using conventional thyratron control circuits, it would be impossible to prevent spurious firings.

Accordingly a different principle of operation has been provided in the present system. Here the thyratrons are so arranged that in the absence of a control signal they would fire repeatedly. The control signal prevents, rather than produces, firing, and any spurious signal due to a transient also tends to prevent firing, firing being permitted only after the transient has decayed. With such an arrangement, filters are eliminated since, now, the more rapidly a transient decays, (as promoted by low time constants in the circuit), the more rapidly the inhibition against control by a proper error signal is removed. In other words, after one thyratron fires to produce a current reversal, there is a finite, but small, time period before the other thyratron may fire, but this time is so short that, considering the period of forced oscillation of the pendulum, there is no interference with the firing of the other thyratron as soon as the error signal can demand such firing.

The present circuit also prevents repeated firing of one thyratron before the other fires, thus eliminating transients which, though they would not cause firing of the second thyratron, would tend to inhibit its firing, but, even more important, would produce sharp pulses in the pendulum coil superimposed on its desired current and causing unaccounted for forces.

The operation of the novel circuit arrangement above described will be clear from the following:

Assume at the start that condenser 58 is negative and that reversal of position of the pendulum coil has occurred so that incoming signals are driving the condenser 56 negative, while condenser 58 starts discharging through the shunting resistance 62. Under these conditions as will become evident hereafter the triode 96 will be conducting and the triode 98 will be cut off. The potential of the grid of thyratron 78 will now rise relative to its cathode to a firing potential. When this potential is reached, discharge occurs through thyratrons 78 producing a negative pulse through condenser 124 to the grid of triode 96 causing cut-off of this triode and rendering triode 98 conductive by triggering action.

The potential of the anode of triode 98 drops and the potential of the anode of thyratron 78 drops correspondingly. At the same time, the potential of the cathode of triode 98 rises causing a corresponding rise of the potential of the cathode of thyratron 78. The result of this is that the thyratron 78 is put in a non-pulsing condition, so that even though the potential of its grid continues to rise no further pulsing occurs.

The transient occuring upon the firing of thyratron 78 will produce, at worst, through the phase detector, a negative output to one or both of the condensers 56 and 58 causing a further negative biasing of one or both of the thyratron grids.

At the same time as triode 78 becomes conducting, cut-off of triode 96 causes a rise of its anode potential and of the potential of the anode of thyratron 76. The potential of the cathode of triode 96 drops causing a corresponding drop of potential of the cathode of thyratron 76, so that thyratron 76 would pulse if its grid were not negative due to the signals accumulating on the condenser 56.

The conditions just described continue until a reversal of position of the pendulum occurs to drive the condenser 58 negative so that condenser 56 discharges with corresponding rise of potential of the grid of thyratron 76 when there occurs an action the reverse of that just detailed.

In summary, the action of the circuit is to produce a reversal of the bistable multivibrator comprising the triodes 96 and 98 each time the potential of a thyratron grid causes a firing and the multivibrator is unaffected adversely by transients which occur in the system. Each thyratron is capable of pulsing only one in any cycle of the multivibrator, the single pulse producing both anode and cathode conditions to avoid continued pulsing.

A pair of triodes 146 and 148 have their grids connected respectively to the grids of triodes 96 and 98. The anodes of these triodes 146 and 148 are connected through equal resistances 150 and 152 to the opposite ends of a potentiometer 154 the adjustable contact of which is connected through line 156 to the output of a current stabilizer which will be shortly described. Potentiometer 154 is adjustable to secure precise equality of resistance between its contact and the anodes of triodes 146 and 148. The anodes just mentioned are also connected through lines 158 and 160 to the terminals of the pendulum coil 2. Between the cathodes of the triodes 146 and 148 there are connected the equal resistances 162 and 164 the junction of which is connected to a line 163 which leads to the current stabilizer. Resistances 166 and 168 in series with a microammeter 170 connect the cathodes. This meter 170 gives an indication of inclination angle and acceleration.

Another pair of triodes 172 and 174 also have their grids respectively connected to the grids of triodes 96 and 98. Each of the cathodes of triodes 172 and 174 is connected to ground through the respective equal load resistors 176 and 178, the two triodes being in cathode follower arrangements with output lines at 180 and 182 leading to the mixer, which will be hereafter described.

From what has been generally said heretofore it will be evident that the differential output from the triodes 146 and 148 serves to produce rectangular current pulses through the pendulum coil 2 for restoration of the coil on the average to its null position. It is extremely important that these pulses, which have different durations as will be hereinafter more fully indicated, should have precisely the same amplitude. For this reason, there is provided a current stabilizer which is illustrated particularly in the upper portion of Figure 2.

The currents alternately flowing through the cathodes of triodes 146 and 148 pass through the connection 163 which is joined to the upper end of an array of precision resistors 184 including a potentiometer 186 having an adjustable contact 188, the lower end of this array of resistors being grounded. A standard cell 190 is arranged to be connected through a switch 192, when the apparatus is in operation, in series with the contact 188 and through resistances 194 and 198 to the contact 200 of a chopper 203. A condenser 196 is connected between the junction of resistances 194 and 198 and ground. This arrangement provides a filter to eliminate from the contact 200 any except slowly varying potentials. The grounded vibrator 202 of the chopper may be operated at any desired frequency through the medium of a drive coil which is not illustrated. A second contact point 204 of the chopper will be hereafter referred to. The contact 200 is connected through condenser 206 to an amplifier of conventional type comprising the pentode stage 208 and two triode stages 210 and 212. The anode of the last-mentioned triode 212 is connected through condenser 214 and resistance 216 to the cathode of a diode 218 provided by connecting together the grid and anode of a triode. The anode of this diode is connected through resistance 220 to ground while signals are taken therefrom through resistance 222 to be applied to the control grid of a pentode 224. A triode 226 connected to the positive high voltage supply through line 228 has its cathode connected through resistance 230 to the anode of pentode 224, the grid of triode 226 being connected directly to the anode of the pentode. The output line 232 is connected to the line 156 running to the adjustable contact of the potentiometer 154 heretofore described.

The operation of the current stabilizer may now be detailed. It will be evident that if the potential at contact 188 due to the flow of current through the line 163 is equal to the potential of the standard cell 190 there will appear a zero potential at the contact 200 and, consequently, no signal will be delivered to the control grid of the pentode 208. If, however, the potential at 188 is greater or less than the potential of the standard cell the action of the chopper, periodically grounding the contact 200, will give rise to an alternating signal at the grid of pentode 208 which will reverse in phase with respect to the driving voltage on the chopper drive coil as the potential 188 is greater or less than that of the standard cell. The alternating signal is amplified and ultimately delivered through condenser 214 and resistance 216 to the cathode of diode 218. The anode of this diode is connected to the contact 204 of the chopper which is alternately connected to and disconnected from ground by the chopper action. A synchronous rectifying action is thus produced. If the potential at 188 is less than that of the standard cell a negative signal is applied to the grid of pentode 224. If the reverse is true, then, due to the presence of diode 218, either no signal or a much lower negative signal is applied to the grid of pentode 224. The constants of the circuit are so chosen that in the absence of a negative control signal at the grid of pentode 224, the correction would always be too small, and consequently the circuit always operates with a small error signal at 188 which is just enough to provide a negative control signal at 224. The pentode 224 controls the grid potential of triode 226 which is in series with the supply connections 232 and 156 to the triodes 146 and 148. The gain of the system is sufficient to insure the maintenance of the current flow through connection 156 at a very nearly constant value. Thus, there is insured the condition indicated above of maintenance of the average amplitudes of the restoring pulses to the coil 2 at constant value.

Figure 2:
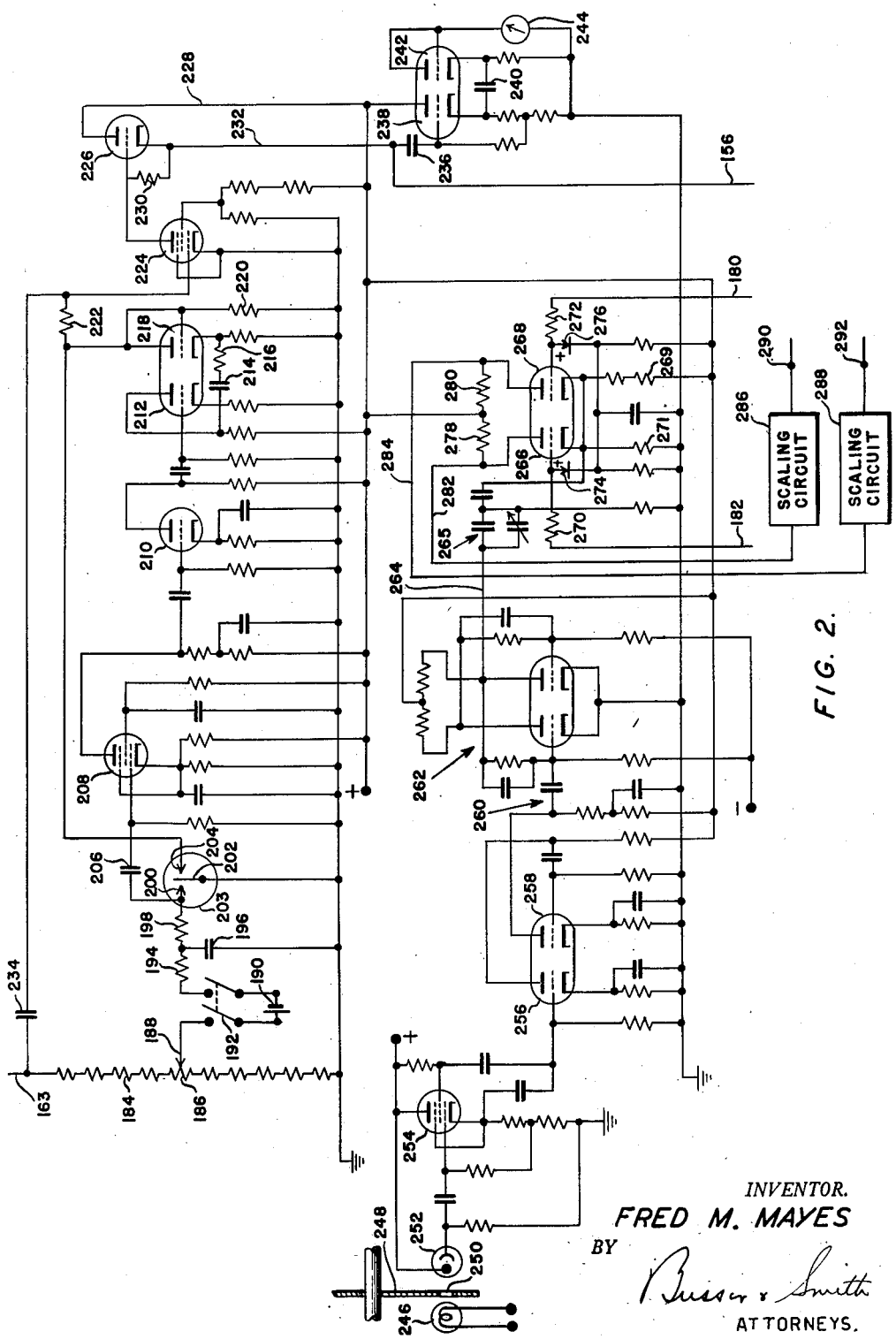
Figure 2 is a wiring diagram showing, in particular, by way of continuation of Figure 1, a pulse stabilizing arrangement and also an arrangement for ascertaining coincidences of pulses originating from two sources.

It will be noted from Figure 2 that a condenser 234 is connected directly between the line 163 and the control grid of pentode 224. If the currents through the triodes 146 and 148 are of equal magnitude, and incidental transients are also missing, it will be evident that no signals will be transmitted through the condenser 234. If, however, the magnitudes of the currents through the triodes 146 and 148 are not equal, or if transients appear in the line 163, signals will be transmitted through the condenser 234 to produce a corrective action by control of the current through the triode 226 thus changing the current momentarily through the triode 146 or 148 which is passing current at the time. In particular, if the triode currents were unequal the corrective action by providing a feed-back will tend toward producing equality.

While there is a corrective action, as just stated, it is preferable to eliminate as far as possible inequalities by proper adjustment of the contact of potentiometer 138, and for this purpose, there is provided a monitoring arrangement which comprises the triode 238 and the diode 242 which is shown as formed by connecting the grid and anode of a triode together. The signal indicative of inequality of the currents is delivered through condenser 236 to the grid of triode 238 which is arranged in a cathode follower circuit. The signal from the cathode of triode 238 is delivered through condenser 240 to the cathode of diode 242 in the circuit of which there is the microammeter 244. The meter 244 is no more than a detector of alternating signals applied to the condenser 236 and adjustment may be made at potentiometer 154 to minimize these signals, which do not become zero, however, due to switching transients. When minimized the currents through triodes 146 and 148 will be of equal amplitude.

In summary of the foregoing, it may be noted that the action of the corrective circuit arrangement is twofold: first, by corrective action (raised to a high degree of precision by preliminary adjustment of potentiometer 138) the rectangular pulses through the triodes 146 and 148 are caused to be of the same amplitude; and, secondly, this common amplitude of the pulses is caused to have a precisely constant value by comparison with the standard cell. Noting that only one of triodes 146 and 148 is at any instant conducting but that one or the other is always conducting, it follows that the current through pendulum coil 2 will be a rectangular wave with the currents flowing in opposite directions precisely equal in magnitude and both of accurately fixed magnitude. The opposite pulses accordingly differ only in duration and this difference in duration becomes, then, the measure of average force restoring the pendulum coil to null position, which in this instance is that of perpendicularity to the roadway.

It may be noted that, whereas the corrective circuit insures equal amplitude of the cathode currents of triodes 146 and 148, the pendulum coil is connected across the anodes of these triodes. For the anodes to have equal current amplitudes, the grid currents of the triodes must be negligible, and this end is accomplished by having the grids biased negative, through 144, so that the grids are negative even when their respective triodes are conducting.

It will be evident that the corrective circuit is of general applicability not only to triodes but to pentodes or other tubes. Furthermore, it will be evident that the controlled amplitude output pulses may be derived from the same electrodes as give the error signals for the corrective circuit as well as from other electrodes as in the instance shown. In the case where the outputs are from other than the signal-giving electrodes, there must, of course, be taken into account total currents; for example, if pentodes are used, with suppressors connected to the cathodes, the outputs must be derived from the added anode and screen currents if control is effected from the added cathode and suppressor currents, and grid currents must be reduced to negligible values. Control of current could, of course, be effected through variation of potential of only one electrode of each pentode. It will be obvious that the error signals could be taken from the anodes of triodes and the load from the cathodes, or corresponding corrections made in the case of pentodes in line with the above.

A lamp 246 is provided to produce light pulses on a photocell 252 through slits 250 in a disc 248 which is driven from a wheel of the trailer so as to have a displacement proportional to the distance traversed. Any desired ratio may be introduced between the trailer wheel and the disc shaft. Desirably, the disc is provided with a sufficient number of slots and is driven at a sufficiently high speed with respect to the trailer wheel so as to provide light pulses of relatively high frequency on the photocell even when the trailer is moving slowly. The light pulses transformed into electrical pulses by the photocell are fed through the pentode 254, acting as a cathode follower to the amplifier including the triodes 256 and 258. These pulses are applied through the condenser-resistor arrangement at 260 to trigger the conventional bistable multivibrator indicated at 262. The output pulses from this multivibrator, differentiated by the condenser-resistor arrangement at 265, are applied to the cathodes of two triodes 266 and 268. The cathodes of these triodes are connected together and to the junction of a pair of resistors 269 and 271 connected between the positive potential supply line and ground, so that, in the absence of pulses received from the multivibrator, the cathodes of these triodes are at a sufficiently high positive potential to be normally cut-off.

The grids of the triodes 266 and 268 are respectively connected through resistors 270 and 272 to the lines 182 and 180, previously referred to, which are connected to the cathodes of triodes 174 and 172. Diodes 274 and 276 are connected to the grids of triodes 266 and 268 at their anode terminals and their cathode terminals are biased by connection to the illustrated resistor arrangement between the positive supply terminal and ground, the result being a clipping circuit to cut down large positive transients accompanying the rectangular waves applied to the grids of the triodes. Load resistors 278 and 280 are respectively connected to the anodes of triodes 266 and 268, and these anodes are connected through lines 282 and 284 to scaling circuits 286 and 288, the outputs of which are delivered at 290 and 292. These scaling circuits are of conventional type and are provided for pre-scaling purposes to bring the frequencies of the output pulses to a sufficiently low value. These pre-scaling circuits, for example, may deliver one output pulse for each thirty-two input pulses.

As will be evident from the circuit arrangements described, the triodes 266 and 268 will be non-conductive except upon coincidence of a negative pulse on the cathode and a positive pulse on the grid of the same tube. When such a coincidence occurs in the case of either triode, a negative pulse will be delivered to one or the other of scaling circuits 286 and 288.

From what has been described heretofore, it will be evident that the grids of triodes 266 and 268 are alternately positive and one or the other is positive at all times. The result is that a series of pulses will be delivered to scaling circuit 286 when the grid of triode 266 is positive and a series of pulses will be delivered to scaling circuit 288 when the grid of triode 268 is positive. If a constant velocity of the vehicle is assumed, it will be evident that, from a statistical standpoint, the number of pulses delivered to the respective scaling circuits will be proportional to the durations of the positive and negative cycles of the square wave appearing between the lines 180 and 182. The difference of the pulses delivered to these scaling circuits would then be a measure of the difference in duration of these positive and negative portions of the wave.

It will be unnecessary in the present case to describe specifically the nature of the integrating action which occurs since this takes place in the same fashion as in said Johnson and Mayes application. It will suffice to remark that the measure of the difference of the pulses received by the two scaling circuits 286 and 288 will be a measure of the integral which gives a change of elevation during the traversing of a path by the vehicle carrying the apparatus. This is due to the fact that the difference in duration of the positive and negative portions of the rectangular wave is a measure of the force required to maintain the pendulum in its null position of perpendicularity to the roadway being traversed, while the number of pulses proceeding from the photocell 252 is a measure of the displacement of the vehicle along the roadway.

With the constants of the apparatus of preferred values the frequency of the pulses delivered by the scaling circuits 286 and 288 will still be much too high for recording on counters and, accordingly, additional scaling circuits are provided following 286 and 288, respectively, to reduce still further the ratio of output pulses to input pulses. These additional scaling circuits involve an improved arrangement for measurement of small increments of elevation and, accordingly, the second scaling circuits will be described in greater detail with particular reference to Figure 3 which shows the wiring arrangement for one such scaling circuit.

Figure 3:
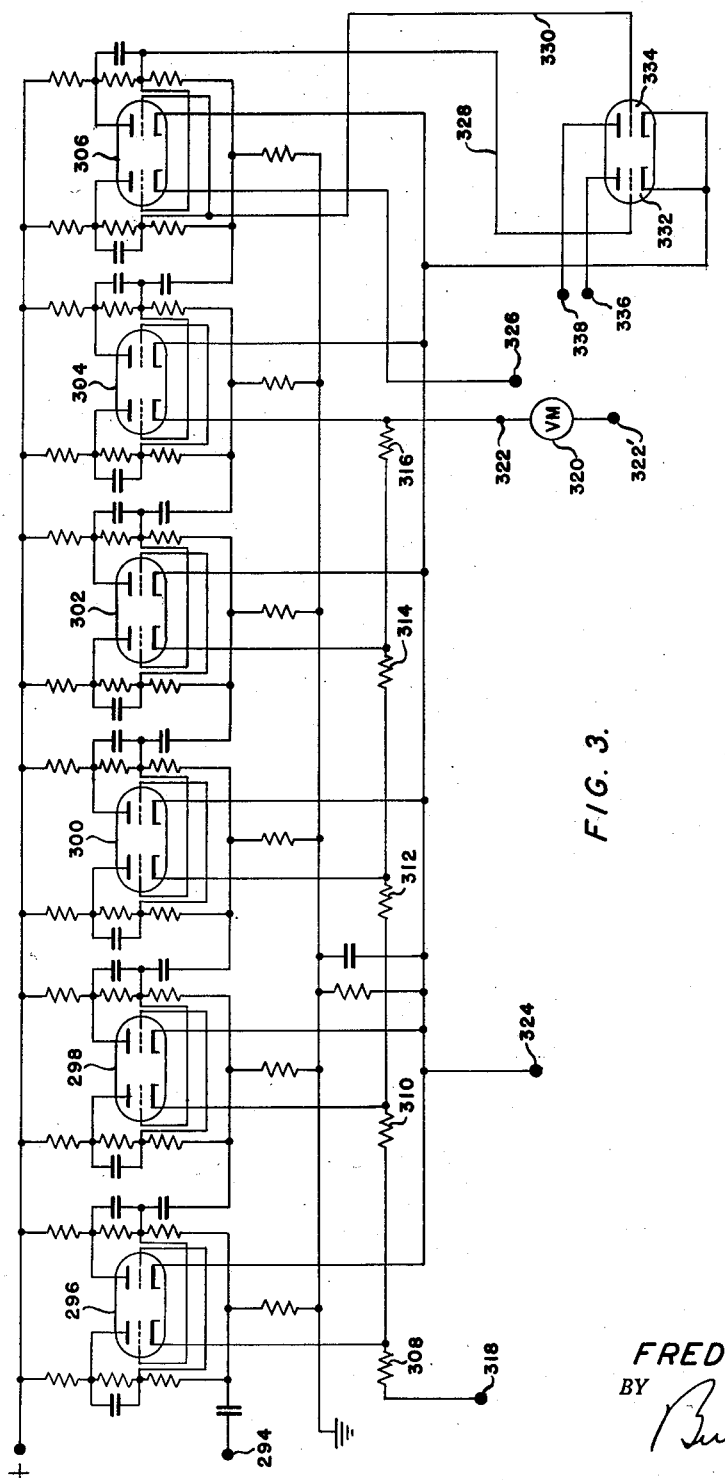
Figure 3 is a wiring diagram showing the improved scaling circuit whereby interpolation may be readily secured.

While the scaling circuits 286 and 288 are entirely conventional, the scaling circuit indicated in Figure 3 is only in part conventional. The input to this scaling circuit is at terminal 294 which may be considered to correspond to either of terminals 290 and 292. Double triodes 296, 298, 300, 302, 304 and 306 are arranged in bistable multivibrator circuits of conventional type arranged in cascade to form a binary counter of generally conventional type. In departure from the usual binary counters, it will be noted that the left-hand triode of each of the double triodes is connected to an arrangement of resistors 308, 310, 312, 314 and 316. The terminal 318 at the left-hand end of this series of resistors is adapted to be connected to a similar terminal of a duplicate of the counter arrangement illustrated in Figure 3. In other words, if the particular scaling circuit or counter of Figure 3 is assumed to receive pulses from scaling circuit 286, the other is arranged to receive pulses from scaling circuit 288. For convenience, the pulses may be respectively referred to as positive and negative pulses, though this terminology is not intended to be applied to the electrical sign of the input pulses but rather refers to the fact that, for ultimate results, the two sets of pulses are to be subtracted from each other. Between a terminal 322 at the right-hand end of the series of resistors and a corresponding terminal 322' of the other scaling circuit there is connected a voltmeter indicated at 320. As will be evident, the voltmeter will read the difference of potential across the respective series of resistors of the two scaling circuits. Stated otherwise, the meter 320 may be considered to read the difference of the two potentials between the respective terminals 322 and 322' and the common terminal 318 of the two scaling circuits.

The respective resistances 308, 310, 312, 314 and 316 have the ratios 1, 1, 2, 4, and 8 so that the successive sums of these resistances starting with 308 have values in the ratio of ascending integral powers of 2 starting with $2°$. As will be evident from consideration hereafter of the purpose, that of securing fractional readings in addition to the unit readings of a mechanical counter or register, these resistors need not be accurately so related but are approximately so related.

The output from each of the scaling circuits is delivered through connections 328 and 330 to the grids of triodes 332 and 334 from which outputs are delivered at terminals 336 and 338. The outputs thus provided from the two scaling circuits are delivered to a differential mechanical counter such as described more fully in said Johnson and Mayes application. It will suffice in the present instance to note that this mechanical counter arrangement registers on a conventional dial counter the difference in number of pulses ultimately delivered from the two scaling arrangements. What is then registered is difference of elevation, and the constants of the circuit including the scaling circuits may be chosen that on the unit dial of the register there are indicated changes in elevation in feet.

It is desirable, however, to provide for indication of fractions of a foot, and this type of indication is provided by a direct reading of the voltmeter 320 which may be graduated in fractions of a foot.

Assuming that the various left-hand triodes of the tubes in the scaling circuit provide equal current flow, it will be evident from consideration of the resistance ratios of resistors 308 to 316, inclusive, that the potential drop across the series of resistors of each scaling circuit will increase as pulses are received thereby by substantially equal increments indicative of the number of received pulses. Accordingly, with the voltmeter 320 connected differentially between the two scaling circuits, the readings of this meter (which may be positive and negative, zero being in the center of the scale) will indicate the difference of the number of pulses received and will indicate an amount to be added or subtracted to the reading of the mechanical counter or register to give a reading in fractions of the unit indicated on that register. It may be here noted that the voltmeter will hold its reading when the vehicle is stopped and, consequently, there is no need to attempt to read it as it is moving.

The terminals 318, 324 and 326 may be assumed for purposes of the foregoing discussion to be connected to a cathode bias potential. Actually, they will be connected to a reset switch arrangement which may either connect these terminals to such cathode bias potential or provide a reset potential in usual fashion to bring the scaling circuits to zero at the beginning of an operation.

It will be evident that, in accordance with the foregoing, certain refinements are provided for the elevation meter described in said Johnson and Mayes application. However, these refinements are of more general applicability, and it will be understood that the invention is not limited to the application of the various matters disclosed above to elevation meters.

For example, the arrangement for providing rectangular waves of equal amplitudes of their positive and negative excursions and of precisely fixed amplitude for both is of quite general applicability wherever it is necessary to provide such accurate control of rectangular waves. As in the particular instance herein described, it is frequently necessary to insure that the duration or relative durations of cycles of such waves be significant without dependence upon amplitude. In the present case, for example, if the amplitudes were different, it is evident that the differences in duration, accumulated over a large number of cycles, would not be a measure of the force applied on the average to maintain the pendulum in its null position. In accordance with the arrangements described, the equality and amplitude of a rectangular wave may be maintained to an accuracy better than 0.01 percent.

It will also be evident that the arrangement for measurement of fractions of the output units of a scaling circuit is of quite general application. Heretofore, provision has generally been made in scaling circuits by the use of neon bulbs to read such fractions. However, it is necessary to consider the significance of the various bulbs and determination of what is actually indicated is a matter of considerable difficulty, particularly since the bulb array is related to the binary system of counting. In accordance with the present invention, a direct reading is secured on a conventional meter scale and may be either decimal or in terms of inches.

A further improvement herein involved which is of general applicability is the provision of the arrangement for rendering, unaffected adversely by transients, the alternative desired firing of a pair of thyratrons. In apparatus such as the present one it is difficult to insure accuracy of results when using thyratrons because of their sensitivity to transients which may occasion spurious firing conditions. In the case of the present arrangement, high stability of the operation of the thyratrons is insured.

What is claimed is:

1. In combination, a pair of electron tubes, each of which has an anode, a cathode and a control grid, said tubes having impedances in their respective anode-cathode circuits, means for supplying to the control grids of said tubes a potential of approximately rectangular waveform, a terminal connected to said impedances and having a potential variable with the sum of anode-cathode current flows in said electron tubes, means connected to said terminal and responsive to deviation of direct component of potential of said terminal from a predetermined value to control flow of current in said electron tubes to maintain substantially at said predetermined value the direct component of potential of said terminal, and means connected to said terminal and responsive to an alternating component of potential at said terminal to control current flow in said electron tubes to maintain substantially at zero the alternating component of potential at said terminal.

2. In combination, a pair of electron tubes, each of which has an anode, a cathode and a control grid, said tubes having impedances in their respective anode-cathode circuits, means for supplying to the control grids of said tubes a potential of approximately rectangular waveform, a terminal connected to said impedances and having a potential variable with the sum of anode-cathode flows in said electron tubes, and means connected to said terminal and responsive to deviation of direct component of potential of said terminal from a predetermined value to control flow of current in said electron tubes to maintain substantially at said predetermined value the direct component of potential of said terminal.

3. In combination, a pair of electron tubes, each of which has an anode, a cathode and a control grid, said tubes having impedances in their respective anode-cathode circuits, means for supplying to the control grids of said tubes a potential of approximately rectangular waveform, a terminal connected to said impedances and having a potential variable with the sum of anode-cathode current flows in said electron tubes, a direct potential standard connected to said terminal to provide a point the potential of which should remain zero, means connected to said point responsive to deviation of the direct component of potential of said point from zero to control flow of current in said electron tubes to maintain substantially at zero the direct component of potential of said point, and means connected to said terminal and responsive to an alternating component of potential at said terminal to control current flow in said electron tubes to maintain substantially at zero the alternating component of potential at said terminal.

4. In combination, a pair of electron tubes, each of which has an anode, a cathode and a control grid, said tubes having impedances in their respective anode-cathode circuits, means for supplying to the control grids of said tubes a potential of approximately rectangular waveform, a terminal connected to said impedances and having a potential variable with the sum of anode-cathode current flows in said electron tubes, a direct potential standard connected to said terminal to provide a point the direct component of potential of which should remain zero, and means connected to said point responsive to deviation of the direct component of potential of said point from zero to control flow of current in said electron tubes to maintain substantially at zero the direct component of potential of said point.

5. In combination, a pair of electron tubes, each of which has an anode, a cathode and a control grid, said tubes having impedances in their respective anode-cathode circuits, means for supplying to the control grids of said tubes a potential of approximately rectangular waveform, a terminal connected to said impedances and having a potential variable with the sum of anode-cathode current flows in said electron tubes, and means connected to said terminal and responsive to an alternating component of potential at said terminal to control current flow in said electron tubes to maintain substantially at zero the alternating component of potential at said terminal.

6. In combination, a pair of electron tubes, each of which has an anode, a cathode and a control grid, said tubes having impedances in their respective anode-cathode circuits, means for supplying to the control grids of said tubes a potential of approximately rectangular waveform so that one or the other of said tubes is always cut-off, a terminal connected to said impedances and having a potential variable with the sum of anode-cathode current flows in said electron tubes, means connected to said terminal and responsive to deviation of direct component of potential of said terminal from a predetermined value to control flow of current in said electron tubes to maintain substantially at said predetermined value the direct component of potential of said terminal, and means connected to said terminal and responsive to an alternating component of potential at said terminal to control current flow in said electron tubes to maintain substantially at zero the alternating component of potential at said terminal.

7. In combination, a pair of electron tubes, each of which has an anode, a cathode and a control grid, said tubes having impedances in their respective anode-cathode circuits, means for supplying to the control grids of said tubes a potential of approximately rectangular waveform so that one or the other of said tubes is always cut-off, a terminal connected to said impedances and having a potential variable with the sum of anode-cathode current flows in said electron tubes, and means connected to said terminal and responsive to deviation of direct component of potential of said terminal from a predetermined value to control flow of current in said electron tubes to maintain substantially at said predetermined value the direct component of potential of said terminal.

8. In combination, a pair of electron tubes, each of which has an anode, a cathode and a control grid, said tubes having impedances in their respective anode-cathode circuits, means for supplying to the control grids of said tubes a potential of approximately rectangular waveform so that one or the other of said tubes is always cut-off, a terminal connected to said impedances and having a potential variable with the sum of anode-cathode current flows in said electron tubes, a direct potential standard connected to said terminal to provide a point the direct component of potential of which should remain zero, means connected to said point responsive to deviation of the direct component of potential of said point from zero to control flow of current in said electron tubes to maintain substantially at zero the direct component of potential of said point, and means connected to said terminal and responsive to an alternating component of potential at said terminal to control current flow in said electron tubes to maintain substantially at zero the alternating component of potential at said terminal.

9. In combination, a pair of electron tubes, each of which has an anode, a cathode and a control grid, said tubes having impedances in their respective anode-cathode circuits, means for supplying to the control grids of said tubes a potential of approximately rectangular waveform so that one or the other of said tubes is always cut-off, a terminal connected to said impedances and having a potential variable with the sum of anode-cathode current flows in said electron tubes, a direct potential standard connected to said terminal to provide a point the direct component of potential of which should remain zero, and means connected to said point responsive to deviation of the direct component of potential of said point from zero to control flow of current in said electron tubes to maintain substantially at zero the direct component of potential of said point.

10. In combination, a pair of electron tubes, each of which has an anode, a cathode and a control grid, said tubes having impedances in their respective anode-cathode circuits, means for supplying to the control grids of said tubes a potential of approximately rectangular waveform so that one or the other of said tubes is always cut-off, a terminal connected to said impedances and having a potential variable with the sum of anode-cathode current flows in said electron tubes, and means connected to said terminal and responsive to an alternating component of potential at said terminal to control current flow in said electron tubes to maintain substantially at zero the alternating component of potential at said terminal.

References Cited in the file of this patent

UNITED STATES PATENTS

| | | |
|---|---|---|
| 2,167,498 | Chambers | July 25, 1939 |
| 2,231,582 | Knight | Feb. 11, 1941 |
| 2,261,982 | Exner | Nov. 11, 1941 |
| 2,310,105 | Michal | Feb. 2, 1943 |
| 2,407,458 | Spielman | Sept. 10, 1946 |
| 2,446,563 | Upton | Aug. 10, 1948 |
| 2,495,390 | Shimek | Jan. 24, 1950 |
| 2,566,933 | Dickinson | Sept. 4, 1951 |
| 2,584,720 | Lawson | Feb. 5, 1952 |
| 2,591,918 | Cole et al. | Apr. 8, 1952 |
| 2,647,323 | Johnson et al. | Aug. 4, 1953 |